United States Patent [19]
Doll

[11] 3,910,228
[45] Oct. 7, 1975

[54] TIRE GROOVING APPARATUS

[76] Inventor: John A. Doll, 7304 Greenlawn Road, Louisville, Ky. 40222

[22] Filed: Sept. 18, 1974

[21] Appl. No.: 507,148

[52] U.S. Cl. .......................... 118/35; 51/3; 51/104; 156/116
[51] Int. Cl.² ......................................... B05C 11/00
[58] Field of Search ......... 118/35, 37; 152/DIG. 12; 156/116, 115; 51/3, 104, DIG. 33; 157/13

[56] References Cited
UNITED STATES PATENTS

| | | | |
|---|---|---|---|
| 1,853,994 | 4/1932 | Peart | 118/35 X |
| 1,983,684 | 12/1934 | Strong | 118/35 |
| 3,001,334 | 9/1961 | Giusti | 51/3 |
| 3,218,208 | 11/1965 | Molen | 156/116 |
| 3,377,222 | 4/1968 | Dean | 156/116 |
| 3,583,105 | 6/1971 | Popp | 51/104 |
| 3,832,972 | 9/1974 | Pace | 118/35 X |

*Primary Examiner*—Nile C. Byers, Jr.

[57] ABSTRACT

The present invention provides an apparatus for cutting at least one groove in the sidewall of a pneumatic tire which can be cut while the tire is mounted on a vehicle with the wheel disposed for independant rotation, and includes an independantly powered cutter head positively positioned against the sidewall of the tire to cut at least one groove in the sidewall of the pneumatic tire as the wheel is rotated, wherein means are provided to continuously urge the cutter head into contact with the sidewall of the tire and wherein limiting means are provided to selectively adjust the depth of cut made by the cutter head in the sidewall. The invention can also provide an applicator arrangement in circumferential alignment with the cutter head to apply a selected material to the groove cut by the cutter head.

11 Claims, 8 Drawing Figures

3,910,228

TIRE GROOVING APPARATUS

BACKGROUND OF THE INVENTION

The sidewalls of automobile tires are frequently decorated by the use of one or more colored or white rings, where, in the case of multiple rings, the rings are concentric. In many instances the rings are provided in the sidewall during the manufacturing process. The rings applied during the manufacturing process are of a generally uniform configuration and are usually white.

In many instances rings of particular configuration or unique design are desirable, and in other cases, rings of selected colors or color combinations are desired. Such configurations or color combinations are generally not available in manufactured tires. Also, manufactured tires are not available with decorative rings of selected color combinations.

Various previous devices have been developed for cutting grooves in tires and adding polymer of selected color to the grooves where tires were initially manufactured without such ornamentation.

In both manufacture of tires with white sidewalls, and in some previous devices for cutting concentric grooves in the sidewalls of a tire after manufacture where a colored polymer or other material is added to the groove for ornamental or other purposes, it has been necessary to remove the tire from the vehicle to cut the groove. Therefore where the groove is to be cut in a tire which has already been mounted on a wheel and vehicle, cutting grooves on such tires has required additional labor and has been time consuming, and expense.

Moreover, most previous devices, as illustrated in U.S. Pat. Nos. 3,001,334, Fiusti, et al., and 3,218,208 Molen, for cutting concentric grooves in the sidewalls of pneumatic tires have provided complex cutting mechanisms, where the tire, which is removed from the vehicle, is mounted on a pedestal to be rotated in contact with the cutter or abrasive means to cut a groove in the side of the tire.

Such systems while satisfactory in some respects, are expensive and complex and also require extra time and labor for removing the tire and wheel from the vehicle, placing the wheel and tire on the device for cutting the sidewall groove and then replacing the wheel on the vehicle.

Other devices as illustrated by U.S. Pat. No. 3,583,105, Popp, have been provided for cutting a concentric sidewall groove in a penumatic tire, while the tire remains in place on the vehicle, but such devices have not provided means to positively and accurately urge the cutter head to continuous contact with the sidewall of the tire, nor have the devices provided means to accurately insure the proper depth of cut in the sidewall.

Likewise, many previous devices for use in cutting grooves in the sidewalls of automotive tires have provided flexible shaft means as power transmission devices for rotation of the cutter means. Since the uniformity and character of the groove cut in the sidewalls is directly affected by the speed of rotation of the cutter wheel such flexible shaft means necessarily limit the speed of rotation of the cutter means and inherently limit the cutting efficiency of the cutter means.

In accordance with one advantageous feature of the present invention, means are provided whereby a high speed motor can be used to drive a cutter means, to cut a groove in the sidewall of a tire. Moreover the present invention provides an advantageous arrangement where the cutter device can be continuously urged into position against the sidewall of the tire, to compensate for irregularities in the sidewall, and wherein the cutter means can include means for limiting the depth of the cut of the groove in a sidewall to prevent damage to the tire.

In accordance with another advantageous feature of the present invention, the cutting device provided by the present invention can include integrated lift means for lifting the vehicle carrying the tires to be grooved to allow the cutter assembly to be positioned for rotation of the selected tires without movement of the vehicle.

The present invention further advantageously provides means for the application of a selected material, for example a colored material or an adhesive to the groove cut in the sidewall.

DESCRIPTION OF THE DRAWINGS

It is recognized that other objects, features, and advantages of the present invention will be apparent to those skilled in the art from consideration of the written description and the appended drawings.

DESCRIPTION OF ONE EXAMPLE OF THE PRESENT INVENTION

Figure 1:
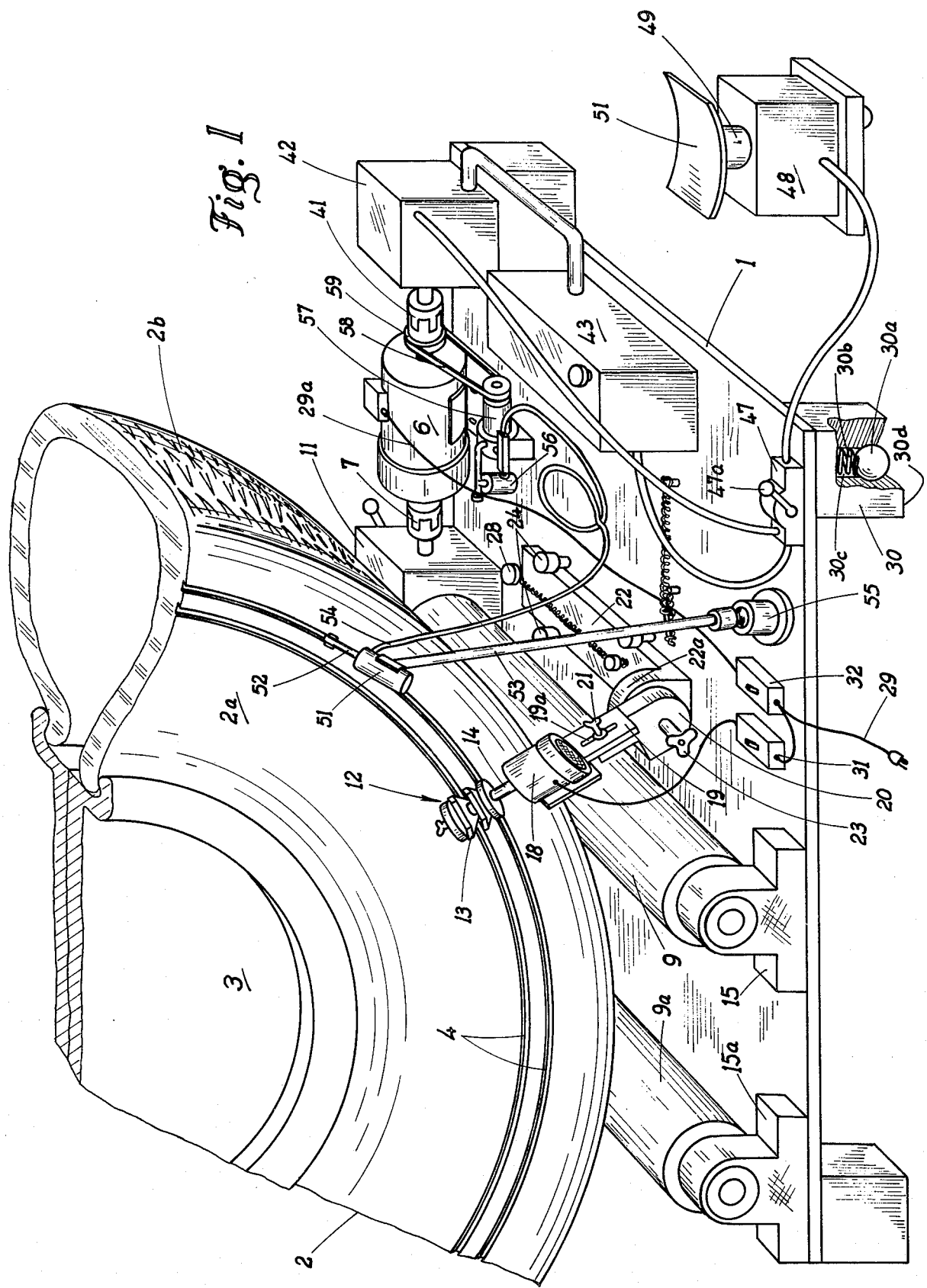
FIG. 1, is a perspective of one example of an apparatus in accordance with the present invention.

Following is a description of one example in accordance with the present invention as shown in the accompanying drawings.

Referring to the illustration of FIG. 1, the example of a groove cutter assembly in accordance with the present invention provides a base plate 1 to receive and secure the hereinafter described element of the cutter assembly. The drawing illustrates a tire 2 having a sidewall 2a, in which at least one groove 4 is to be cut, while the tire 2 is mounted on a wheel 3 which, can advantageously be in a place on a vehicle (not shown).

As described hereinafter tire 2 and wheel 3 are rotated on the vehicle axle (Not shown) to turn sidewall 2a whereby cutter 13, infra, cuts the selected grooves 4. The tread portion 2b of tire 2 can advantageously, be positioned on rollers 9 – 9a. Roller 9a can be an idler roller journaled on base 1 by means of bearings 15a. Roller 9 can be a driver roller mounted on base 1 at one end by means of journal bearing 15 and at the other end to drive means 11 to be selectively rotated, for rotation of tire 2 as hereinafter described. As shown, roller 9 can include serrated surfaces, to increase the coefficient of friction between tire 2 and roller 9 to expedite rotation of tire 2. A drive motor 6 for example an electric motor to be connected to a power source by means of a cord 29a is carried on base 1 and connected by means of a coupler 7 to a shaft 8 of a differential speed reducer 11 (which can advantageously be a variable speed reducer) also fastened to base 1, to rotate drive roller 9 at selected speed.

Figure 2:
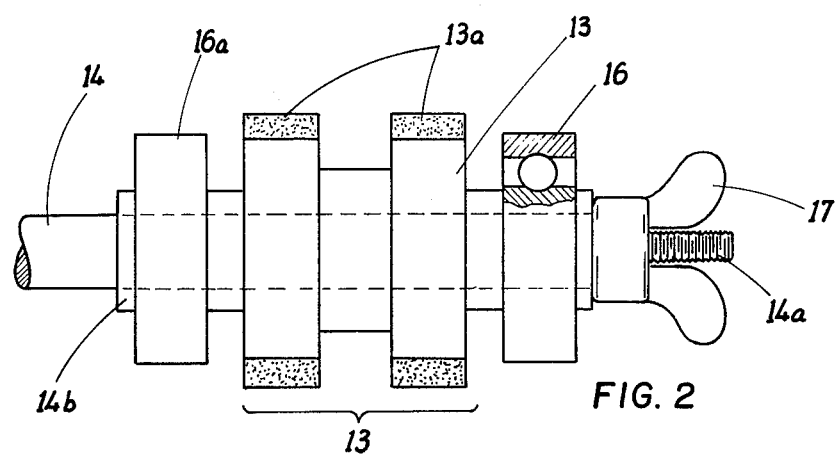
FIG. 2, is an exploded view of a cutter head assembly which can be used in the apparatus in accordance with the present invention as shown in FIG. 1; and, FIG. 3 a–c, illustrate examples of cutter means which can be used in the apparatus shown in FIG. 1 in accordance with the present invention.

In accordance with another advantageous feature of the present invention, a cutter assembly 12 is provided and adapted to cut at least one groove in the sidewall 2a of tire 2. In the example of the present invention shown in the Figures, cutter assembly 12, as shown in FIG. 2 includes a cutter head 13 with a double blades 13a spaced around the periphery of head 13 as described hereinafter. As also shown in the example of FIG. 2, cutter head 13 is disposed on a shaft 14 of a cutter motor 18, described hereinafter, between idler wheels 16 and 16a for example roller bearings of selected diameter which advantageously rotate freely about shaft 14. Cutter head 13 is mounted to rotate with shaft 14 by means of a slotted keyway (not shown), a setscrew, or other suitable means, so that cutter head 13 is rigidly connected for rotation with shaft 14. A finger nut 17 can be provided to engage a thread end 14a of shaft 14 to retain idler wheels 16 and cutter head 13 on shaft 14 between finger nut 17 and a shoulder 14b advantageously provided by shaft 14 to engage bearing 16a.

Referring again to FIG. 1 cutter assembly shaft 14 is connected to a motor 18 provided for rotation of shaft 14 and cutter head 13 where motor 18 can, advantageously, be an electric motor.

Motor 18 can be carried by an arm 19 where a longitudinal slot 19a is provided in arm 19 as shown. Arm 19 is attached to a pivot 20 by means of a finger screw 21 inserted through slot 19a and received by pivot 20 whereby arm 19 can be selectively secured to pivot 20 to permit longitudinal positioning of motor 18 and cutter assembly 12 along the radius of tire 2a.

Pivot 20 is connected to a leg 22a of a sliding base 22, described hereinafter, by means of a screw 23 received by cooperative threads in leg 22a of base 22 so that as screw 23 is drawn tight to secure pivot 20 against the leg of arm 22, an arm 19 can cutter assembly 12 are secured in selected angular position with respect to base 1, and the longitudinal axis of cutter assembly 12 can advantageously, be directed parallel to a radius line of tire 2 and wheel 3.

Base 22 is retained on base plate 1 by means of spaced shoulder bolts 24 carried by base plate 1 so base 22 retain beneath the shoulders of bolts 24. The space between plate 1 and the underside of each shoulder bolt 24 is selected so sliding movement of base 22 on base 1 is permitted.

In accordance with the example of the present invention shown in the Figures shoulder bolts 24 are arranged in generally parallel spaced relation on either side of and immediately adjacent to opposite sides of base 22 to prevent movement of arm 22 in base 1 in a direction other than parallel to the longitudinal axis of base 22. Therefore bolts 24 also provide guide means to direct longitudinal movement of base 22, on base plate 1. A stop pin 28 can be provided on base plate 1, as shown, to limit longitudinal movement of base plate 22 in one direction. In accordance with another advantageously feature of the present invention a tension spring 25 is connected to stop pin 28 and pin 27 carried by base 22 thereby urging base 22 toward a rest position against pin 28 and also urging cutter head 12 to contact with sidewall 2a as shown when base 22 is drawn away from stop 28.

Thus in accordance with the foregoing example cutter assembly 12 can be selectively positioned with respect to any tire sidewall by proper selected of angular disposition of pivot 20 as well as the longitudinal position of arm 19 and the position of base plate 22 on base 1.

In accordance with another advantageous means of the present invention, means are provided to limit the depth of cut of the groove in the sidewall of tire 2 and to assure depth of cut of groove 4.

Figure 3A:
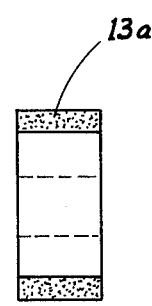
Figure 3B:
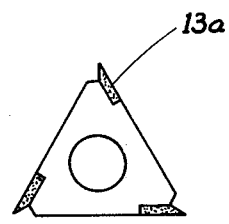
Figure 3C:
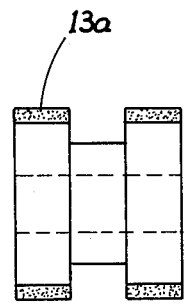

More particularly, referring now the example shown in FIG. 3b, cutter assembly 12 can include a cutter head 13 having cutter blades 13a selectively spaced around the diameter of cutter head 13, where the outer edge of the cutter blades define the effective cutting diameter of cutter head 13. Cutter head 13 is advantageously selected so that the effective cutting diameter of cutter head is greater than the diameter of idler wheels 16 and 16a. Thus, as shown in FIG. 2, the maximum depth of the groove cut in sidewalls 2a of tire 2 is no more than the difference in diameter between idler wheels 16 and 16a and the outer diameter of cutters 13a of wheel 13. Accordingly, even though tire 2 is rotated, past cutter assembly 12 more than one time, no damage can be done to the sidewall of the tire because the cutter assembly will not cut deeper into the sidewall of the tire on subsequent rotation. Furthermore, idler wheels 16 and 16a engage the surface portion of sidewall 2a of the tire 2 so that any irregularity in the sidewall is compensated for by wheels 16 and 16a and reflected by movement of cutter head 13 to assure uniform depth of groove 4.

In the example of FIG. 1, motors 6 and 18 are electrically powered. The power is provided by a source of electricity which can be supplied by a power supply cord 29 to a first switch 31 which operates cutter motor 18 of cutter assembly 12. A second switch 32 is provided to control supply of power to motor 6 to operate roller 9 and pump 42 (described hereinafter. In the arrangement shown, motor 18 is inoperable until switch 32 is actuated, so that tire 2 is not rotated prior to the actuation of cutter motor 18.

Base 1 is carried by spring loaded roller assemblies 30 as shown. Compression springs 30b are provided within a cavity 30c, of each roller assembly 30 to contact a roller 30a to urge rollers 30b out of the cavity of assembly 30 and into contact with the surface (not shown) over which the assembly carried by base plate 1 is moved so base 1 can be roller over such surface on rollers 1. When a predetermined force is applied to base 1, rollers 30a retract into the cavity of assembly 30 and the bottom 30b the assembly contacts the surface to prevent movement of base plate 1 on said surface.

In accordance with another feature of the present invention, motor 6 is connected by means of a coupler 41 to a hyrraulic pump 42, carried by base 1, where pump 42 operates means, described hereinafter, to lift the vehicle carrying tire 2 to selected position with respect to cutter assembly 12.

In accordance with this feature of the present invention, hydraulic fluid is stored in a reservoir 43 as shown, which is mounted to base plate 1. Hydraulic fluid is withdrawn from reservoir 43 by means of a hose assembly 44, to pump 42 be emitted at selected pressure by means hose 46 to jack assembly 48. A two way valve 47 is provided to operate jack 48, includes a lift means 49, having a cradle 51 which can be positioned under the axle of a vehicle (not shown) to lift the vehicle to raise wheel 3 for positioning tire 2 on rollers 9–9a and to permit cutter assembly 12 to be positioned against the sidewall 2a of tire 2 carried by wheel 3 as hereinbefore described.

Valve 47 includes a handle 47a to operate valve 47 to a first position to allow hydraulic fluid under pressure from pump 42 to enter jack assembly 48 by means of hose 48 to lift the vehicle for positioning of cutter 12 of base plate 1, with respect to wheel 2. Upon completion of the cutting operation and removal of base 1 from under the vehicle, handle 47a is moved to a second position, whereby hydraulic fluid under pressure in jack 48 can be returned through valve 47 to the reservoir 43 through hoses 48 and 49.

In accordance with another feature of the present invention an applicator assembly 51 is provided to apply a selected material, for example a colored latex material, an adhesive or a reflective material, to groove 4 cut in sidewall 2a.

Advantageously, as described hereinafter applicator 51 includes dispenser head assembly 52 to direct the material into groove 4.

The material to be applied through applicator 51 is supplied by means of a hose 54 to applicator 51 by a cooperative pump 57 driven by a belt 58 operating off a pulley 59 driven by motor 6.

Figure 4A:
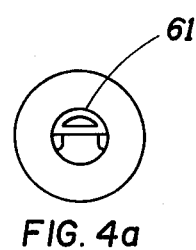
FIGS. 4 a–c illustrate examples of applicators which can be used to apply selected materials to the grooves cut in sidewalls of tires.
Figure 4B:
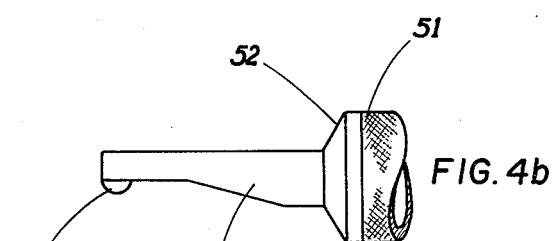
Figure 4C:
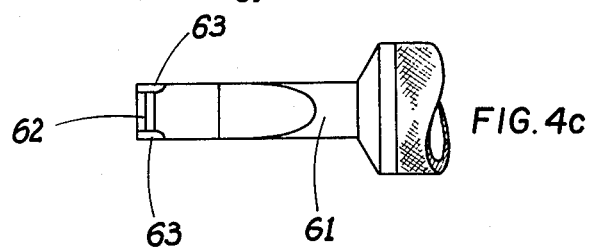

Referring now to FIG. 4 which shows three views of one example of an applicator head 52 which can be used in operation of the apparatus disclosed, the applicator head can be connected to assembly 51 at one end and has an outlet tube 61 which is tapered, as shown, to an outlet 62 for emission of the material to be applied to groove 4. Tips 63 are provided in spaced relation to extend laterally from tube 61, as shown, in spaced relation. Advantageously, the spacing between tips 63 approximates the width of groove 4 to direct the material to be applied into groove 4. It will be noted that the thickness of the layer of the material applied to the tire is determined by the space between the outermost edge of tips 63 and edge 62, inasmuch as tire 2 is rotated toward applicator head 52. Tips 63 can be rounded so that the thickness of the material to be applied can be determined by the angular position of head 52.

It is to be understood that other applicator means, for example spray devices, can be used within the scope of the present invention.

In operation life 49 of jack 48 is placed under the axle of the wheel to be grooved, operation of motor 6 is initiated and the vehicle is raised to a selected height to receive base plate 1. Base 1 is urged under the automobile tire until the surface of the tire 2 contacts the serrated surface of the roller 9. Sufficient force is exerted against base 1 to depress base plate 1 to retract rollers 30a into recess 30c of each assembly 30 to prevent base plate 1 from moving freely during the cutting operation. Cutter assembly 12 is then placed in position by means heretofre mentioned. The angular disposition of the cutter assembly 12 is adjusted by means of screw 23 and the longitudinal position of cutter 12 is adjusted by means of an arm 19. With cutter assembly 12 in in position, cutter motor 18 is then actuated to begin rotation of cutter head 13 to begin cutting the selected grooves in sidewalls 2a of tire 2. The wheel is allowed to make at least one revolution producing to cut at least one groove in sidewall 2a of tire 2. However, as previously noted, no great damage is done if the wheel is allowed to make more than one revolution.

When, for example, a latex or adhesive material is to be applied to sidewall 2a of tire 2, applicator assembly 51 is positioned by adjustment of arm 53 so that applicator head 52 is disposed with tips 63 for example, at the outer edges of groove 4 to prevent the material from flowing to areas of the sidewall outside groove 4. In some applications where an adhesive is applied to sidewall 2a it is desirable to apply the adhesive to the portions of sidewall 2a immediately adjacent groove 4. In such cases, the spacing between tips 63 is greater than the width of groove 4 and tips alone define the width of the strip of material applied over groove 4.

In another procedure within the scope of the present invention tire 2 is rotated at least one time to cut groove 4 before applicator 51 is position so that the material is applied on a subsequent rotation of tire 2.

It will be recognized by those skilled in the art that there are various other arrangements in accordance with the present invention and the foregoing is not intended in any way to limit the scope of the present invention, or is limited only by the claims appended hereto.

I claim:

1. An apparatus for cutting at least one groove in a side wall of a rotatably mounted tire comprising:
   a. base plate means;
   b. roller assembly means carried by said base plate means to receive said tire and rotate said tire about its axis in response to rotation of said roller means;
   c. rotatable cutter assembly means including rotatable cutter head means and cooperative motive means to rotate said cutter head adjustably connected to said base means to be selectively urged against a selected portion of said sidewall of said tire to cut at least one groove in said sidewall of said tire as said tire is rotated wherein said cutter means is connected to said base means by adjustable arm means assembly to selectively position said cutter head means to contact said sidewall of said tire; and;
   d. spring means cooperatively affixed to said adjustable arm means and said base means to continuously urge said cutter head means to contact with said sidewall to maintain continuous contact between said sidewall and said cutter head means during rotation of said tire; and
   e. roller assembly motive means to rotate said roller means and said tire while said rotatable cutter head means is in contact with said tire sidewall.

2. The apparatus of claim 1 wherein said cutter means includes: an electric cutter motor; generally circular cutter head means of selected diameter rigidly connected to the power shaft of said cutter motor; and, first and second idler wheels of selected diameter less than the cutting diameter of said cutter head disposed on said cutter motor power shaft on each side of said cutter head wherein said idler wheels are independently rotatable and disposed to contact said sidewall of said tire while said cutter head cuts at least one groove in said sidewall wherein the depth of said groove cut in said sidewall is approximately equal to the difference in diameter of said cutter head and said idler wheels.

3. The apparatus of claim 1 wherein said adjustable arm means assembly includes: to carry said adjustable arm means carrying said rotatable cutter means; retainer means to hold said cutter arm base means against said base plate means and permit said first arm means to slide in at least one selected direction on said base plate; guide means to define a path of movement of said cutter arm base means on said base plate means toward and away from said tire; and spring means affixed to said cutter arm base means and said base plate means to urge said cutter arm base means along said guide means in a direction to maintain contact between said rotatable cutter means and said sidewall of said tire.

4. The invention of claim 3 wherein said adjustable arm means assembly further includes: longitudinally adjustable arm means to carry said cutter means; pivot means pivotally securing said arm means to said cutter arm base means whereby the angular disposition of said arm means with respect to said base means can be selectively adjusted.

5. The apparatus of claim 1 including: motor means to provide power for said roller means; pump means connected to said motor means to provide source of fluid at selected pressure; jack means operable in response to fluid pressure from said pump means adapted to receive fluid from said pump means and adapted to be placed beneath a vehicle to raise said vehicle in response to said fluid at said selected pressure to facilitate positioning said tire with respect to said roller means.

6. The invention of claim 1 including: fluid applicator means adapted to apply selected fluid to the areas of said tirewall in which said groove is cut.

7. The invention of claim 6 wherein said fluid applicator means is carried by fluid applicator arm means adjustably secured to said base means to permit said fluid applicator means to be selectively adjusted to position contiguous with said tire to apply said selected fluid to said sidewall.

8. The invention of claim 6 including pump means to supply said selected fluid to said fluid applicator means.

9. The invention of claim 6 wherein said fluid applicator means includes fluid sprayer means.

10. The invention of claim 6 wherein said fluid applicator means includes tube means to contact said sidewall in the area in which said groove is cut and having outlet means to apply said fluid to said area.

11. The invention of claim 10 wherein said tube means includes parallel, selectively spaced, tip means extending outwardly from said tube means adjacent said outlet to engage said area of said tire sidewall to limit the width of the area to which said fluid is applied.

* * * * *